Jan. 23, 1968   J. SEREDA   3,364,649
APPARATUS FOR SEALING VACUUM ENCLOSURES
Filed June 28, 1963   4 Sheets-Sheet 1

INVENTOR.
JOSEPH SEREDA
BY Eugene C. Trautlein
ATTORNEY

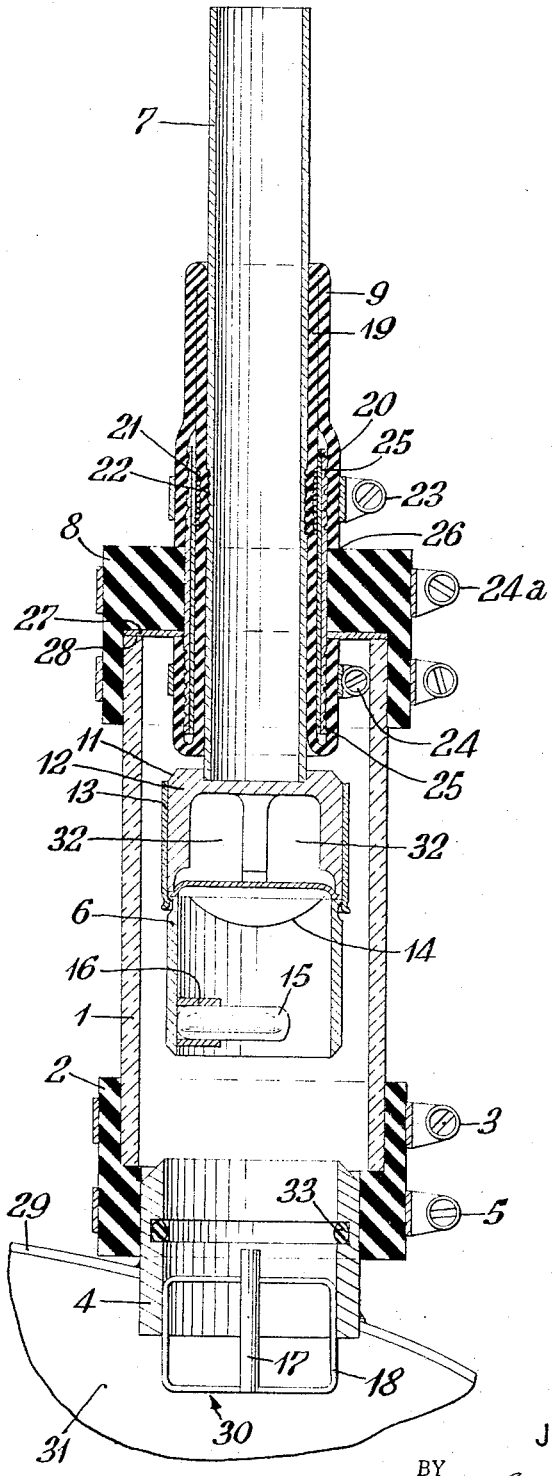

Jan. 23, 1968 J. SEREDA 3,364,649
APPARATUS FOR SEALING VACUUM ENCLOSURES
Filed June 28, 1963 4 Sheets-Sheet 3

INVENTOR.
JOSEPH SEREDA
BY
ATTORNEY

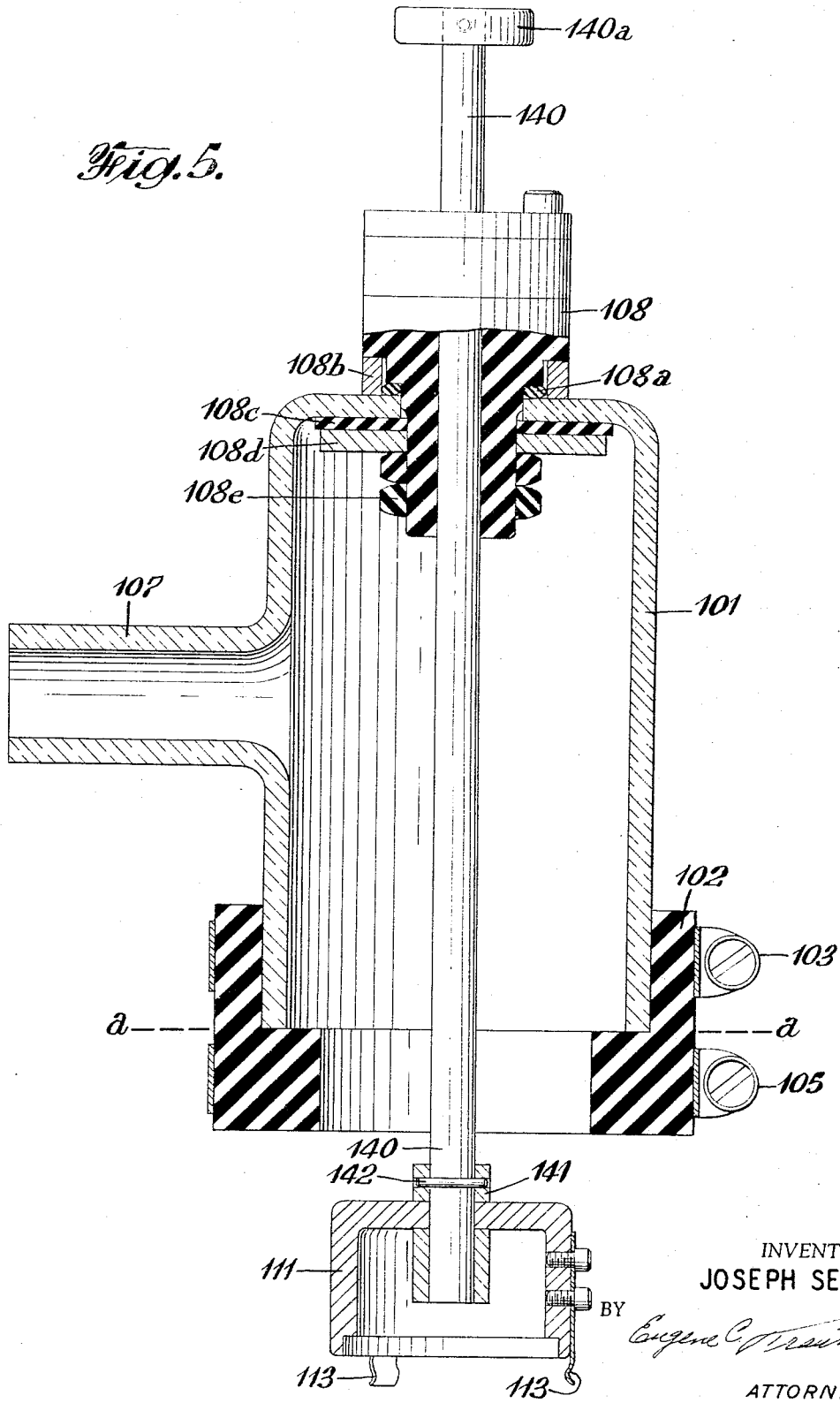

United States Patent Office 3,364,649
Patented Jan. 23, 1968

3,364,649
APPARATUS FOR SEALING VACUUM
ENCLOSURES
Joseph Sereda, Indianapolis, Ind., assignor to Union
Carbide Corporation, a corporation of New York
Filed June 28, 1963, Ser. No. 291,511
2 Claims. (Cl. 53—88)

It is generally recognized by the cryogenic industry that low-boiling liquefied gases such as liquid oxygen and liquid nitrogen should be stored in double-walled vacuum insulated containers for greater protection against heat in-leak. Such containers are generally evacuated by the use of a vacuum pump, the pump being connected to the container insulation space through a tube which is subsequently "pinched-off" and sealed after the evacuation has been completed.

One method of performing the "pinch-off" operation is to use a tool having two straight anvils, the anvils being compressed together so as to squeeze the tube. Although this method is sufficient to retain a vacuum for relatively short periods of time, a final seal must be assured for prolonged periods of use. This can be done in several ways. One method is to pinch-off with cold welding. However, cold welding requires a friction movement of the two metallic surfaces which is difficult to perform on a tube. Another method is to pinch-off through resistance welding. Although this method is technically simple, it requires special and costly welding equipment. Still another method is to line the tube with a solder, so that when the tube is pinched and heated, the solder forms a seal. The tube is then cut-off above the pinched area and further filled with solder. Although this technique is relatively simple, it is sometimes unsuccessful because of the difficulty in holding the pinch-off tool in place until the solder effects a gas-tight seal. In general, it can also be said that pinch-off tools are cumbersome irrespective of the particular pinch-off method employed.

One solution to the pinch-off problem is the use of an occlusion element to close the evacuation spud (i.e. a conduit attached to the outer wall which encloses the evacuable space) connecting the vacuum tube to the container after the evacuation has been completed. This solution, however, leads to the problem of introducing the occlusion element into the spud in a gas tight relationship without allowing air to leak into the vacuum space through the spud. This problem has been overcome by the novel apparatus to be described hereinbelow.

An object of this invention is to provide a relatively cheap, compact and simple apparatus for providing a gas-tight seal for conduits used in evacuating evacuable enclosures.

Other objects of this invention will become apparent from the following disclosure.

This invention provides an apparatus comprising an evacuation chamber having a sealing means for sealing the chamber to a coupling means or spud which is in gaseous communication with an evacuable enclosure. The coupling means can be a conduit (e.g. a metal tube) attached, as by welding, to the outer wall surrounding the evacuable space. The means for sealing the chamber to the coupling means is such that the chamber can be readily detached from the coupling means after the evacuable enclosure has been evacuated. The chamber is also provided with an occlusion element which, when the chamber is attached to the coupling means, is capable of being moved within the chamber from a recessed position to a sealing position. When in its sealing position, the occlusion element seals the coupling means and is arranged and constructed so as to be readily detachable from the chamber at that time. The occlusion element and the chamber are so arranged and constructed that movement of the occlusion element within the chamber to its sealing position and subsequent detachment does not permit air to enter the chamber. The movement of the occlusion element is accomplished by providing a moving means which extends into the chamber through an opening in the chamber that is opposite the open end of the chamber which is attachable to the coupling means by the sealing means. The occlusion element is attached to the portion of the moving means that is within the chamber in such a manner as to be readily detachable when in its sealing position. The evacuation chamber is further provided with a vacuum pump connecting conduit for providing gaseous communication between a vacuum drawing means (e.g. a vacuum pump) and the chamber. The vacuum pump connecting conduit can also serve as the occlusion element moving means as shown in FIGURES 1 and 4. Alternatively, the connecting conduit and the moving means can be separate structures as shown in FIGURE 5. When the chamber is sealed to the coupling means by the sealing means and connected to a vacuum pump by the connecting conduit, the evacuable enclosure can be evacuated by means of the pump. Thereafter, the occlusion element is moved to its sealing position by the moving means and the chamber is then detached from the coupling means and the occlusion element is detached from the moving means. The evacuable enclosure has thereby been evacuated and remains so owing to the sealing action of the occlusion element now securely positioned in the coupling means. Upon the insertion of another occlusion element into the chamber, the apparatus of the invention can be used in evacuating another evacuable enclosure.

As an added novel feature, the apparatus of this invention can be provided with a bursting disc in the occlusion element. This feature eliminates the need for a separate container opening on those insulated containers requiring the disc for the relief of excessive pressures inadvertently built up within the evacuated insulation space of the container. Elimination of this separate opening simplifies the fabrication of the container. As another novel feature, means can be employed to release a "getter" (e.g. powdered barium or palladium oxide) within the evacuation space as the occlusion element is inserted into the coupling means.

The invention can more readily be described with reference to the accompanying drawings in which:

FIGURE 4 is a view taken in vertical cross section of the FIGURE 1 apparatus.

FIGURE 5 is a view taken in vertical cross section of another novel apparatus of this invention.

Figure 1:
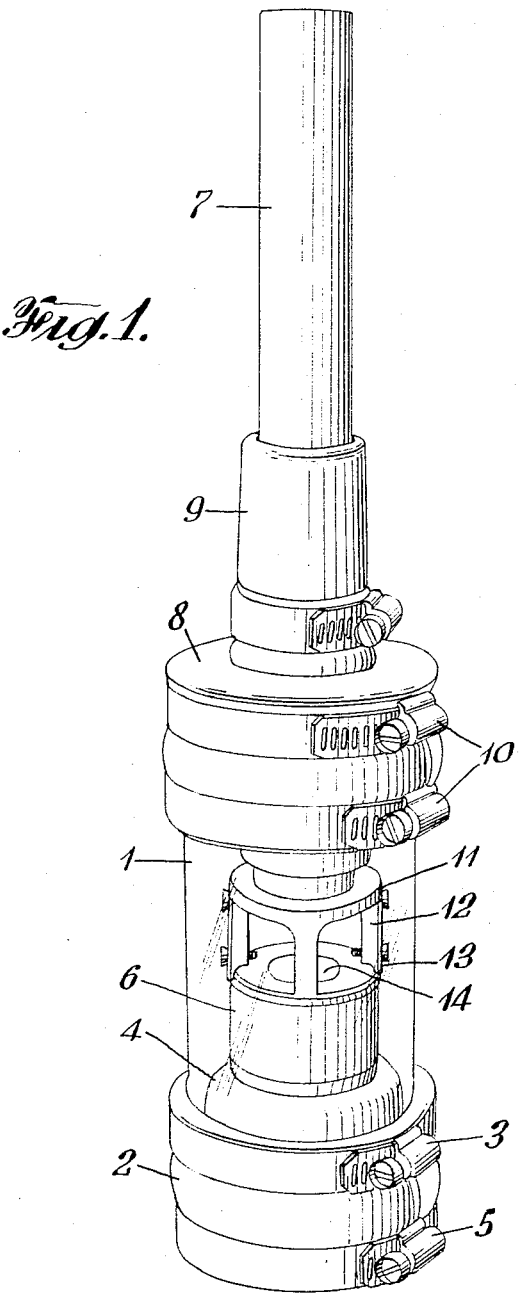
FIGURE 1 is an isometric longitudinal view of a novel apparatus of this invention showing its general concepts.

FIGURE 1 shows an apparatus of this invention comprising evacuation chamber 1 having, as a coupler sealing means, rubber gasket 2 which is gas-tightly sealed to evacuation chamber 1 by clamp 3 and to a coupling means or spud 4 by clamp 5. Occlusion element 6 is shown entering in its sealing position in which it seals coupling means or spud 4 that is in gaseous communication with an evacuable space (not shown). Chamber 1 is preferably constructed of glass or other transparent material in order to permit the operator to observe the effectuation of the seal of the coupling means after the pumping has been completed. Vacuum pump connecting conduit 7 slidably engages the glass evacuation chamber 1 through the rubber gasket 8 and conduit sealing means 9. Rubber gasket 8 is lightly held against chamber 1 by clamps 10. Attached to conduit 7 at its inner end projecting into chamber 1 is a housing 11 having a plurality of projections 12 which, in conjunction with resilient metal strips or springs 13, carries occlusion element 6. In the embodiment of FIGURES 1 and 4, projections 12 are integral parts of housing 11 to which springs 13 are fastened by screws. Springs 13 extend below projections 12 and tend to bend inwardly. However, springs 13 are resilient and can be forced outward when occlusion element 6 is forced upward against the bottom of projections 12. This creates tension in springs 13 which maintains the occlusion element 6 in the position shown. As shown in FIGURES 1 and 4, occlusion element 6 contains a bursting disc 14 horizontally disposed across the upper portion of the occlusion element. It should be understood, however, that the invention is not limited to any specific configuration of the occlusion element and that other occlusion elements such as a simple non-bursting disc or a solid plug could also be used.

Figure 2:
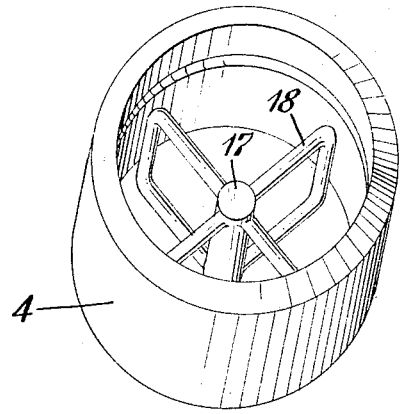
FIGURE 2 is an isometric view looking downward on a coupling means adapted for use with the apparatus of FIGURE 1.
Figure 3:
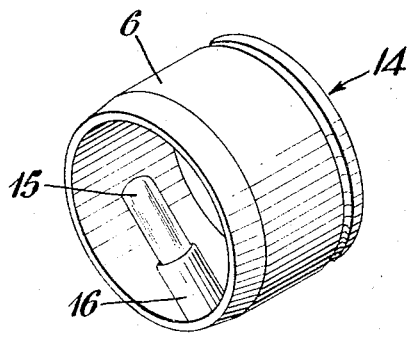
FIGURE 3 is an isometric end view of the occlusion element employed in the apparatus of FIGURE 1.

Referring to FIGURES 2 and 3, occlusion element 6 also contains a rupturable getter capsule 15 supported by the tube 16 which can be broken by the pin 17 carried by the bracket 18 in the coupling means or evacuation fitting 4 as occlusion element 6 is inserted into sealing relationship with coupling means 4.

The operation of the device and the particular details of conduit sealing means 9 for the conduit 7 can best be described with reference to FIGURE 4. Referring to FIGURE 4, conduit sealing means or assembly 9 comprises a flexible tube, such as rubber tubing 19, and a copper or other metal tubing 20. Tubing 19 is tightly held against vacuum pump connecting conduit 7 by the wire 21. Wire 21 compresses tubing 19 against the grooves 22 formed in conduit 7 while metal sealing tubing 20 is held in position by clamp 24a. Rubber tube 19 is folded over and leak tightly compressed against metal sealing tubing 20 through the clamps 23 and 24. The latter compress rubber tubing 19 into grooves 25 formed in metal sealing tubing 20. Rubber tube 19 is sealed to gasket 8 at 26 and chamber end wall 27 at 28 by some suitable adhesive such as by glue. With this construction, evacuation vacuum pump connecting conduit 7 is free to move longitudinally within chamber 1 (thereby moving occlusion element 6 from its recessed position shown in FIGURE 4 to the sealing position it has almost assumed as shown in FIGURE 1) and yet be leak tightly sealed in relation to chamber 1.

While the sealing means for the vacuum pump connecting conduit 7 of FIGURES 1 and 4 has been described with reference to a particular piece of apparatus, it should be understood that other arrangements could also be used. For example, end wall 27 could be eliminated. Likewise, the leak-tight joints at 26 and 28 have only been used as an added precaution against possible air leakage. They could in all probability be eliminated due to the effectiveness of the seal created by the clamps 23 and 24.

In the assembly of the apparatus of FIGURES 1 and 4, the coupling means 4 (e.g. a metal tube) is first welded to the container 29 so as to be in axial alignment with container opening 30. The entire apparatus of this invention including the occlusion element 6 is then fitted over the coupling means 4 and leak-tightly sealed by the clamps 3 and 5. The outer end of vacuum pump connecting conduit 7 is then joined to a vacuum pump (not shown). Insulation space 31 is then evacuated by drawing the air from the space consecutively through coupling means 4 and chamber 1 and then out vacuum pump connecting conduit 7 by way of openings 32 in housing 11.

After the evacuation has been completed, but while the vacuum pump is still operating, occlusion element 6 containing bursting disc 14 is forced into the coupling means 4 by lowering vacuum pump connecting conduit 7, rubber tube 19 being capable of folding over itself. As the occlusion element 6 enters coupling means 4, it will form a leak-tight seal with O-ring 33. Also, the getter capsule 15 will be broken by the pin 17. After the occlusion element 6 has been inserted, the vacuum pump is stopped, clamps 3 and 5 are released, and the whole vacuum chamber assembly removed. The occlusion element 6 will be released from the springs 13 by simply retracting conduit 7 and will remain in place by virtue of the tightness of the fit with the O-ring 33 and the force of atmospheric pressure acting upon occlusion element 6. Although O-ring 33 will effect a vacuum-tight seal, it is preferable, as a safety measure, to seam weld the upper rim of the occlusion element to the upper rim of coupling means 4. Thus, the apparatus of FIGURES 1 and 4 permits an occlusion element to be leak-tightly inserted into the evacuation coupling means 4 without the leakage of air into the vacuum space.

Figure 4A:
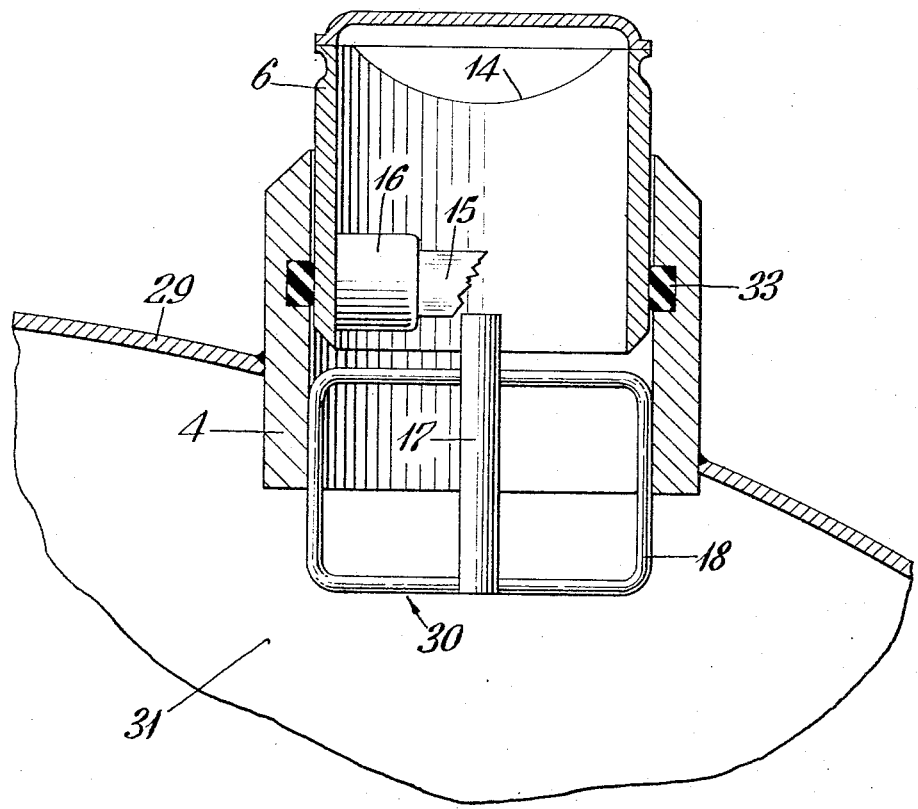
FIGURE 4a is a view taken in cross section of the coupling means sealed with the occlusion element of FIGURES 1 and 4.

FIGURE 4a shows a coupling means 4 sealed with occlusion element 6 in the manner described above. Capsule 15 has been broken by pin 17, thereby releasing a getter material. O-ring 33 maintains a seal between the outer surface of occlusion element 6 and inner surface of coupling means 4. Any excess pressure in evacuated space 31 of container 9 will be relieved by the rupture of bursting disc 14.

FIGURE 5 shows another apparatus of this invention. The apparatus of FIGURE 5 comprises transparent evacuation chamber 101, having, as a coupler sealing means or assembly, rubber gasket 102 which is gas-tightly sealed to evacuation chamber 101 by clamp 103 and to a coupling means (not shown) by clamp 105. Occlusion element holder 111 is provided with clips 113 which are adapted to hold an occlusion element (not shown). The occlusion element can be of the same type as shown in FIGURE 3. Occlusion element holder 111 is shown extended somewhat beyond the point for placing the occlusion element in its sealing position in a coupling means. Vacuum pump connecting conduit 107 is an integral part of evacuation chamber 101 and, in operation, is in gaseous communication both with a vacuum pump (not shown) and, through evacuation chamber 101, with the space being evacuated. The outer diameter of occlusion element holder 111 and the occlusion element are sufficiently smaller than the inner diameter of evacuation chamber 101 so that, when occlusion element in any recessed position above line a—a, an uninterrupted gaseous path is provided from the evacuable space, through the vacuum pump connecting conduit 107, evacuation chamber 101 and the coupling means to the vacuum pump. Holder 111 of FIGURE 5 serves the same function as the housing 11 of FIGURES 1 and 4. Likewise, the clips 113 correspond to the springs 13 in FIGURES 1 and 4. Movement of holder 111 with respect to rod 140, is prevented by ring 141, which is brazed or otherwise joined to the rod 140 and the pinned stop 142. Rod 140 with the holder 111 is free to move in and out of the evacuation chamber 101. Even though the rod 140 is free to move, evacuation chamber 101 is still maintained vacuum tight through the gasket 108. To maintain this relationship, gasket 108 is held, outside the chamber, by the O-rings 108a which are held by the collar 108b. Inside the chamber, the relationship is maintained through the gasket 108c and washer 108d. These elements are held gas tightly in position by the rings 108e which preferably are made of an expandable material such as rubber.

The operation of the apparatus of FIGURE 5 is the same in principle as that of FIGURES 1 and 4. Gasket 102 is positioned over the coupling means of the container to be evacuated. A vacuum is then maintained by connecting conduit 107 to a vacuum pump. Holder 111, carrying the occlusion element is then lowered into the coupling means by application of force to the handle 140a of rod 140. The evacuation chamber is then detached from both the coupling means by loosening clamp 105 and the occlusion element by retracting rod 140. The occlusion element then maintains the vacuum in the evacuable enclosure.

The apparatus of this invention are adaptable to various evacuation operations. They can be used to advantage in evacuating the evacuable enclosures between the walls of double-walled pipes used as conduits for cryogenic liquids and in evacuating the evacuable enclosures between the walls of double-walled cryogenic liquid storage containers. It is desirable to evacuate these enclosures to aid in minimizing heat leak into such conduits and containers.

What is claimed is:

1. An apparatus adapted for use in evacuating an evacuable enclosure through coupling means, said apparatus comprising an evacuation chamber having open first and second ends and being provided with:
    (1) detachable sealing means for gas tightly connecting the first end of said chamber to said coupling means in gaseous communication with the evacuable enclosure,
    (2) a vacuum conduit connectable to vacuum drawing means,
    (3) an occlusion element moving means having an outer end outside of said chamber and an inner end extending within the second end of said evacuation chamber, said moving means being longitudinally slidable in said second end and leak-tightly joined thereto,
    (4) an occlusion element arranged and constructed for longitudinal movement from a recessed position providing gaseous communication between said vacuum drawing means consecutively through said vacuum conduit, said evacuation chamber and said coupling means to said enclosure, and movable to a gas-sealing position within said coupling means, said occlusion element having a hollow interior containing a transversely positioned bursting disc for relieving any excess pressure in the evacuable enclosure when the occlusion element is in its sealing position, and
    (5) means for removably attaching said occlusion element to the inner end of said moving means within said evacuation chamber, being adaptable for detaching such element from said moving means without releasing the gas seal.

2. An apparatus adapted for use in evacuating an evacuable enclosure through coupling means, said apparatus comprising an evacuation chamber having open first and second ends and being provided with:
    (1) detachable sealing means for gas tightly connecting the first end of said chamber to said coupling means in gaseous communication with the evacuable enclosure,
    (2) a vacuum conduit connectable to vacuum drawing means,
    (3) an occlusion element moving means having an outer end outside of said chamber and an inner end extending within the second end of said evacuation chamber, said moving means being longitudinally slidable in said second end and leak-tightly joined thereto,
    (4) an occlusion element arranged and constructed for longitudinal movement from a recessed position providing gaseous communication between said vacuum drawing means consecutively through said vacuum conduit, said evacuation chamber and said coupling means to said enclosure, and movable to a gas-sealing position within said coupling means,
    (5) means for removably attaching said occlusion element to the inner end of said moving means within said evacuation chamber, being adaptable for detaching such element from said moving means without releasing the gas seal, said occlusion element having a hollow interior with a getter-containing breakable capsule positioned therein and said coupling having means provided with a projection adapted to contact and break said capsule at the moment the occlusion element is moved to its sealing position to cause release of said getter in order to remove any remaining trace of gas in the evacuable enclosure.

References Cited

UNITED STATES PATENTS

| | | | |
|---|---|---|---|
| 203,796 | 5/1878 | Trezise | 53—101 X |
| 2,032,862 | 3/1936 | Wilkins | 53—88 X |
| 2,198,752 | 4/1940 | Barr | 53—88 X |

TRAVIS S. McGEHEE, *Primary Examiner.*